(12) United States Patent
McCaffrey

(10) Patent No.: US 9,200,530 B2
(45) Date of Patent: Dec. 1, 2015

(54) RADIAL POSITION CONTROL OF CASE SUPPORTED STRUCTURE

(75) Inventor: Michael G. McCaffrey, Windsor, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 659 days.

(21) Appl. No.: 13/554,211

(22) Filed: Jul. 20, 2012

(65) Prior Publication Data
US 2014/0023480 A1 Jan. 23, 2014

(51) Int. Cl.
*F01D 11/16* (2006.01)

(52) U.S. Cl.
CPC .............. *F01D 11/16* (2013.01); *Y02T 50/672* (2013.01)

(58) Field of Classification Search
CPC ........ F01D 11/025; F01D 11/08; F01D 11/16
USPC ............ 415/134–136, 138–139, 171.1, 173.3
See application file for complete search history.

(56) References Cited

U.S. PATENT DOCUMENTS

| | | | |
|---|---|---|---|
| 3,841,787 A * | 10/1974 | Scalzo | 415/136 |
| 4,005,946 A | 2/1977 | Brown et al. | |
| 4,363,599 A | 12/1982 | Cline et al. | |
| 4,527,385 A | 7/1985 | Jumelle et al. | |
| 4,596,116 A | 6/1986 | Mandet et al. | |
| 4,859,143 A | 8/1989 | Larrabee et al. | |
| 5,154,575 A | 10/1992 | Bonner | |
| 5,333,993 A | 8/1994 | Stueber et al. | |
| 5,603,510 A | 2/1997 | Sanders | |
| 5,639,210 A | 6/1997 | Carpenter et al. | |
| 5,738,490 A * | 4/1998 | Pizzi | 415/139 |
| 6,547,522 B2 * | 4/2003 | Turnquist et al. | 415/173.3 |
| 6,896,484 B2 * | 5/2005 | Diakunchak | 415/173.1 |
| 7,025,563 B2 | 4/2006 | Servadio et al. | |
| 7,033,138 B2 * | 4/2006 | Tomita et al. | 415/139 |
| 7,198,454 B2 | 4/2007 | Evans | |
| 7,210,899 B2 | 5/2007 | Wilson, Jr. | |
| 7,306,428 B2 | 12/2007 | Schiebold et al. | |
| 7,494,317 B2 * | 2/2009 | Keller et al. | 415/136 |

(Continued)

FOREIGN PATENT DOCUMENTS

| EP | 2090754 | * | 8/2009 |
|---|---|---|---|
| EP | 2434106 A2 | | 3/2012 |

OTHER PUBLICATIONS

U.S. Appl. No. 13/095,326, "Blade Clearance Control Using High-CTE and Low-CTE Ring Members".

(Continued)

*Primary Examiner* — Craig Kim
*Assistant Examiner* — Kayla McCaffrey
(74) *Attorney, Agent, or Firm* — Carlson, Gaskey & Olds, P.C.

(57) ABSTRACT

A radial position control assembly for a gas turbine engine stage includes a case structure. A supported structure is operatively supported by the case structure. The supported structure includes a hook providing an annular recess. A support ring is received in the recess. The supported structure and the support ring have different coefficients of thermal expansion. A sealing structure is adjacent to the supported structure. The support ring maintains the supported structure relative to the sealing structure at a clearance during thermal transients based upon a circumferential gap between adjacent supported structure and based upon a radial gap between the support ring and the supported structure.

21 Claims, 4 Drawing Sheets

(56) References Cited

U.S. PATENT DOCUMENTS

| | | |
|---|---|---|
| 7,819,622 B2 | 10/2010 | Paulino et al. |
| 2004/0047726 A1* | 3/2004 | Morrison ...................... 415/116 |
| 2005/0220610 A1* | 10/2005 | Ghasripoor et al. ....... 415/173.3 |
| 2009/0208322 A1* | 8/2009 | McCaffrey .................... 415/113 |
| 2013/0017057 A1* | 1/2013 | Lagueux ........................... 415/1 |

OTHER PUBLICATIONS

International Search Report and Written Opinion for International Application No. PCT/US2013/046270 completed on Aug. 26, 2013.

International Preliminary Report on Patentability for International Application No. PCT/US2013/046270 mailed Jan. 29, 2015.

* cited by examiner

RADIAL POSITION CONTROL OF CASE SUPPORTED STRUCTURE

BACKGROUND

This disclosure relates to a gas turbine engine having a case, for example, for a compressor section of the engine. More particularly, the disclosure relates to controlling the radial position of a structure supported by the case during thermal transients.

Multiple fixed and rotatable stages are arranged within the case of the engine's static structure. Typically, supported structure, such as stators and blade outer air seals, are fastened to the case. Radial clearances must be provided between the stators, blade outer air seals and adjacent sealing structure of rotating structure, such as rotors and blades. Since the supported structure and case are in close proximity to and affixed relative to one another, the supported structure thermally responds to the bulk case temperature. Thus, during temperature transients the supported structure may move radially inward more than desired, which may cause a rub event.

To avoid rub events, the designed radial clearances between the static and rotating structure are enlarged. During generally steady-state temperatures, the clearances are larger than necessary, which reduces the efficiency of the stage during cruise conditions, for example.

SUMMARY

In one exemplary embodiment, a radial position control assembly for a gas turbine engine stage includes a case structure. A supported structure is operatively supported by the case structure. The supported structure includes a hook providing an annular recess. A support ring is received in the recess. The supported structure and the support ring have different coefficients of thermal expansion. A sealing structure is adjacent to the supported structure. The support ring maintains the supported structure relative to the sealing structure at a clearance during thermal transients based upon a circumferential gap between adjacent supported structure and based upon a radial gap between the support ring and the supported structure.

In a further embodiment of any of the above, the case structure is a compressor case. The supported structure is a blade outer air seal and the sealing structure is a blade.

In a further embodiment of any of the above, the case structure is a compressor case, and the supported structure is an outer platform of a vane.

In a further embodiment of any of the above, the vane is arranged in a vane cluster.

In a further embodiment of any of the above, the coefficient of thermal expansion of the support ring is less than the coefficient of thermal expansion of the supported structure, and the support ring is a continuous circumferentially unbroken annular structure.

In a further embodiment of any of the above, the support ring is constructed from one of a ceramic matrix composite and a metal alloy, and the supported structure is constructed from one of a ceramic matric composite, a metal alloy and a monolithic ceramic.

In a further embodiment of any of the above, the support ring includes first and second states, and the supported structure includes expanded and contracted positions in each of the first and second states of the support ring. The circumferential gap is about zero in the expanded state and the circumferential gap is greater than zero in the contracted state. The support ring is enlarged in the second state with respect to the first state. The hook and support ring respectively include first and second surfaces that are radially adjacent to one another to provide the radial gap. The radial gap is about zero in first and fourth conditions. The first condition is with the support ring in the first state and the supported structure contracted. The fourth condition is with the support ring in the second state and the support structure contracted. The radial gap is greater than zero in second and third conditions. The second condition is with the support ring in the first state and the supported structure expanded. The third condition is with the support ring in the second state and the support structure expanded.

In a further embodiment of any of the above, the first condition corresponds to a cold condition. The second condition corresponds to a warm condition. The third condition corresponds to a hot condition. The fourth condition corresponds to a rapid deceleration condition from the hot condition.

In a further embodiment of any of the above, the support structure includes fore and aft hooks. Fore and aft support rings are respectively arranged in the fore and aft hooks.

In a further embodiment of any of the above, the radial position control assembly includes a fore and aft seal arranged axially between the case structure and the fore and aft support rings respectively. At least one of the fore and aft seals provides an axial biasing force to the supported structure.

In a further embodiment of any of the above, the radial position control assembly includes a radial biasing member arranged between the case structure and the supported structure provides a radial biasing force to the supported structure.

In another exemplary embodiment, a gas turbine engine includes a compressor section. The compressor section includes low and high compressors. A combustor is fluidly connected downstream from the compressor section. A turbine section is fluidly connected downstream from the combustor. The compressor section includes a compressor case. A supported structure is operatively supported by the compressor case. The supported structure includes a hook providing an annular recess. A support ring is received in the recess. The supported structure and the support ring have different coefficients of thermal expansion. A sealing structure is adjacent to the supported structure. The support ring maintains the supported structure relative to the sealing structure at a clearance during thermal transients based upon a circumferential gap between adjacent supported structure and based upon a radial gap between the support ring and the supported structure.

In a further embodiment of any of the above, the compressor is the high pressure compressor. The supported structure is arranged in at least one of a fixed and a rotatable stage of the high pressure compressor.

In a further embodiment of any of the above, the supported structure is a blade outer air seal and the sealing structure is a blade.

In a further embodiment of any of the above, the supported structure is an outer platform of a vane.

In a further embodiment of any of the above, the coefficient of thermal expansion of the support ring is less than the coefficient of thermal expansion of the supported structure. The support ring is a continuous circumferentially unbroken annular structure.

In a further embodiment of any of the above, the support ring includes first and second states. The supported structure includes expanded and contracted positions in each of the first and second states of the support ring. The circumferential gap is about zero in the expanded state and the circumferential gap is greater than zero in the contracted state. The support ring is enlarged in the second state with respect to the first state. The hook and support ring respectively include first and second surfaces that are radially adjacent to one another to provide the radial gap. The radial gap is about zero in first and fourth conditions. The first condition is with the support ring in the first state and the supported structure contracted. The fourth condition is with the support ring in the second state and the support structure contracted. The radial gap is greater than zero in second and third conditions. The second condition is with the support ring in the first state and the supported structure expanded. The third condition is with the support ring in the second state and the support structure expanded.

In a further embodiment of any of the above, the first condition corresponds to a cold condition. The second condition corresponds to a warm condition. The third condition corresponds to a hot condition. The fourth condition corresponds to a rapid deceleration condition from the hot condition.

In a further embodiment of any of the above, the support structure includes fore and aft hooks. Fore and aft support rings are respectively arranged in the fore and aft hooks.

In a further embodiment of any of the above, the gas turbine engine includes a fore and aft seal arranged axially between the case structure and the fore and aft support rings respectively. At least one of the fore and aft seals provides an axial biasing force to the supported structure.

In a further embodiment of any of the above, the gas turbine engine includes a radial biasing member is arranged between the case structure and the supported structure provides a radial biasing force to the supported structure.

BRIEF DESCRIPTION OF THE DRAWINGS

The disclosure can be further understood by reference to the following detailed description when considered in connection with the accompanying drawings wherein.

DETAILED DESCRIPTION

Figure 1:
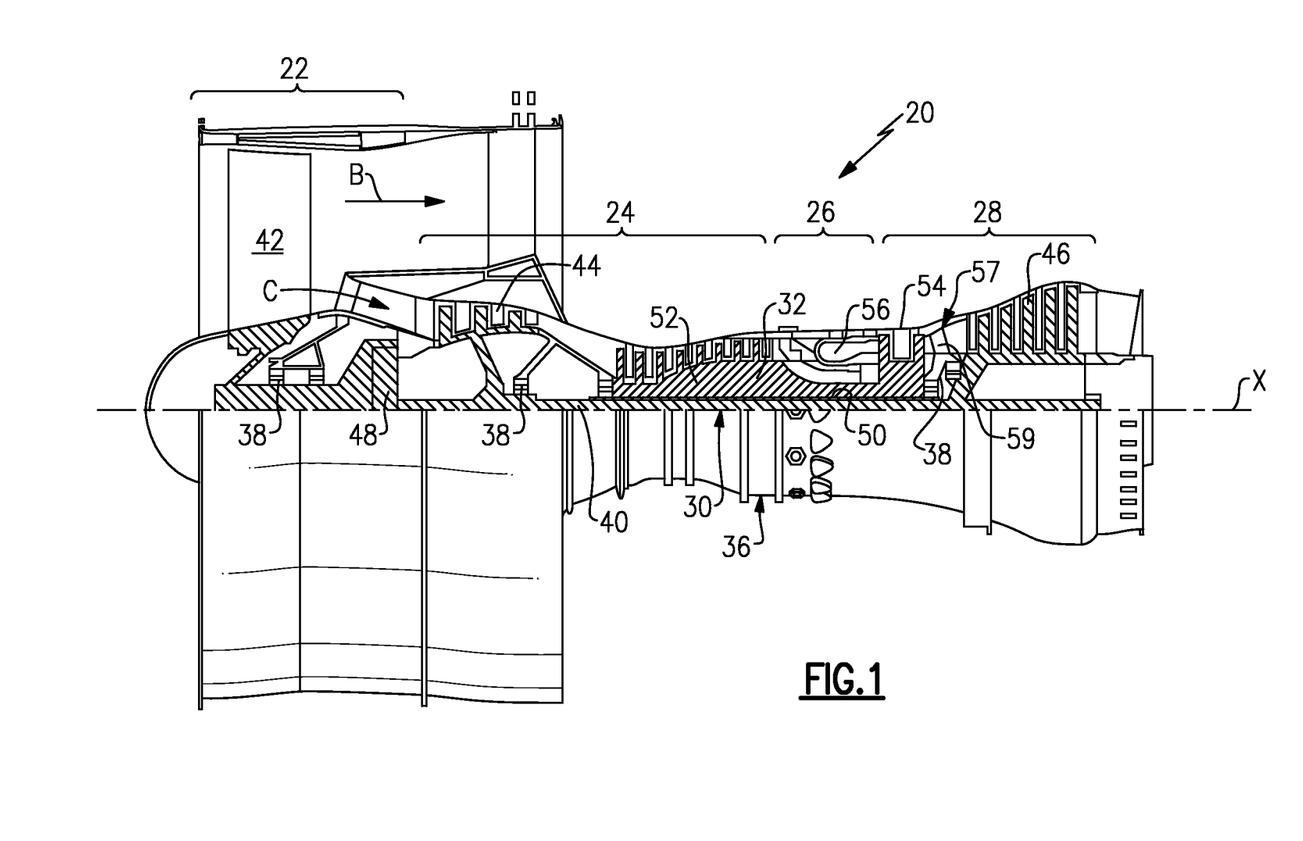
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than a 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of [(Tram ° R)/518.7) 0.5]. The "Low corrected fan tip speed", as disclosed herein according to one non-limiting embodiment, is less than about 1150 ft/second.

Figure 2A:
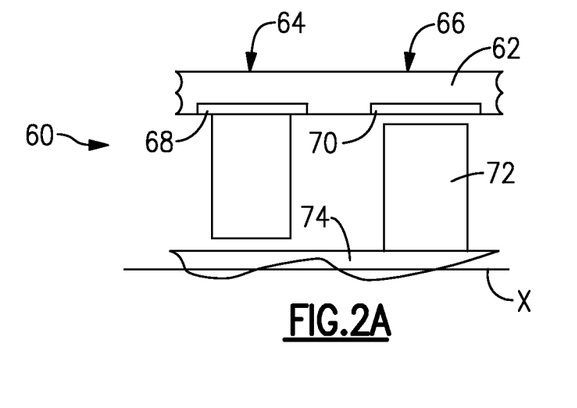
FIG. 2A is a schematic view of a section of the engine illustrating both fixed and rotatable stages.

FIG. 2A illustrates a section 60 of the engine 10. The section 60 includes a case structure 62 of the engine static structure 36. The case structure 62 includes a fixed stage 64 and a rotatable stage 66. The fixed stage 64 includes an array of stator vanes, and the rotatable stage 66 includes an array of blades 72 mounted on a rotor 74 rotatable about the axis X. In the fixed stage, a supported structure 68, such as an outer platform of one or more vanes, is operatively supported by the case structure 62. An inner diameter of the vanes seals relative to rotatable structure, such a rotor. In the rotatable stage 66, a supported structure 70, such as a blade outer air seal (BOAS), is operatively supported by the case structure 62. It is desirable that the desired radial clearance within the fixed stage and rotatable stage 64, 66 is minimal to maintain high operating efficiency through the section 60 during various operating conditions and transients. A typical desired clearance between the supported structure and the adjacent sealing structure is 0.000-0.010 inch (0.00-0.25 mm) at cruise.

To this end, a radial position control system is used to regulate the radial position of supported structure 78 relative to the case structure 76, as illustrated in FIGS. 3A-3D. These supported structures 78 include at least one hook 80, which defines an annular recess 82 that opens to a lateral side of the supported structure. A support ring 84 is received within the recess 82. In the example, the support ring is a continuous, unbroken structure about its circumference (e.g., support ring 108, FIG. 4C). However, this is not to say that the support ring 84 cannot be formed by a multiple segments. Rather, the support ring 84 should be provided by a continuous structure such that the structure cannot circumferentially uncouple about its circumference. That is, the support ring 84 should expand and contract as a single unitary structure.

The supported structure 78 and the support ring 84 have different coefficients of thermal expansion (CTE). The support ring 84 has a lower CTE than the support structure 78 such that the support structure 78 expands and contracts more quickly than the support ring 84. In this manner, the support ring 84 is more dimensionally stable during thermal transients. In one example, the support ring 84 is a ceramic matrix composite or a metal alloy, and the supported structure 78 is a ceramic matrix composite, metal alloy or monolithic ceramic.

The supported structure 78 includes a member 86, which may be a stator vane or blade outer air seal, for example. It is desirable to control the radial position of member 86 during thermal transients. The difference in coefficients of thermal expansion between the supported structure 78 and the support ring 84 controls the radial position of the member 86 relative to its adjacent sealing structure.

Figure 2B:
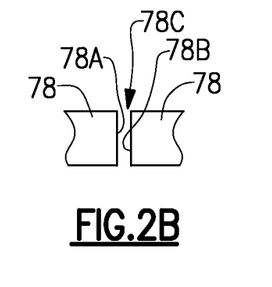
FIG. 2B is a schematic view depicting circumferentially adjacent supported structures having a circumferential gap.
Figure 3A:
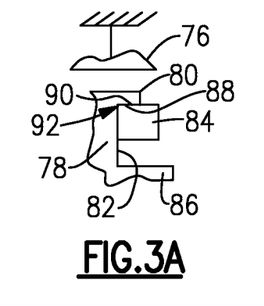
FIG. 3A schematically depicts a first condition corresponding to a support ring in a first state and a supported structure in a contracted position.
Figure 3B:
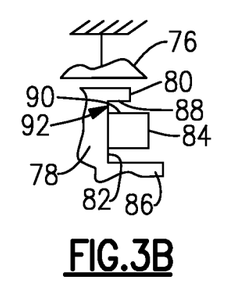
FIG. 3B schematically depicts a second condition corresponding to the support ring in the first state and the supported structure in an expanded position.

Referring to FIG. 3A-3B, the first and second surfaces 88, 90 are respectively provided by the hook 80 and the support ring 84. The first and second surfaces 88, 90 are radially adjacent to and engageable with one another during certain conditions, discussed below. Referring to FIG. 2B, the first and second surfaces 78A and 78B of the circumferentially adjacent supported structures 78 create a gap 78C, and are engageable with one another during certain conditions discussed below.

Figure 3C:
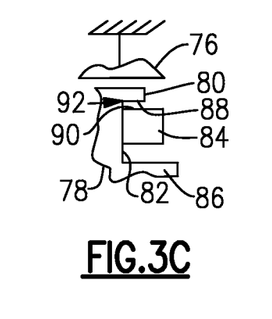
FIG. 3C schematically depicts a third condition corresponding to the support ring in a second state and the supported structure in an expanded condition.
Figure 3D:
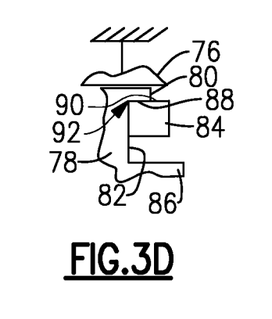
FIG. 3D schematically depicts a fourth condition corresponding to the support ring in the second state and the supported structure in the contracted position.

Referring to FIGS. 3A-3B, the support ring 84 is illustrated in a first state, which is at a lower temperature and contracted compared to a second state (shown in FIG. 3C-3D). With continuing reference to FIG. 3A, the supported structure 78 is shown in a first condition (cold) in which the first and second surfaces 88, 90 are contacting one another, eliminating the gap 92. Surfaces 78A and 78B are not in contact providing gap 78C, best shown in FIG. 2B. In this condition, the support ring 84 is loaded.

Figure 2C:
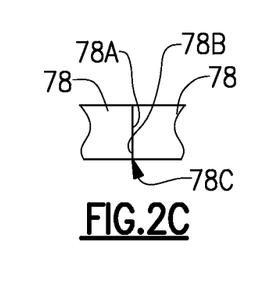
FIG. 2C depicts the supported structures of FIG. 2B without the circumferential gap.

As the supported structure 78 expands more rapidly than the support ring 84, the member 86 will move to the second condition (warm), shown in FIG. 3B, During the heating process, a point occurs where the supported structure 78 increases in temperature and expands, and the circumferential growth of supported structure 78 increases to a point when the gap 78C is reduced to zero, best shown in FIG. 2C. Up to this point, the supported structure 78 is still loading support ring 84. This transient point in heating of supported structure 78 is called the "lock-up" point. In this transient condition, between the first condition and the second condition, the first and second surfaces 88, 90 are still engaged with one another but the support ring 84 is no longer loaded.

With the gap 78C reduced to zero, any further heating of supported structure 78, will cause its circumference to grow as if they were made as a solid, full ring structure. Since the supported structure 78 has a higher CTE than the support ring 84 any further heating of the supported structure 78 will result in the gap 92 to increase from zero. When the support structure 78 reaches the second condition, the circumferential growth of the supported structure 78 has increased to the point where the gap 92 is large, and the support ring 84 is unloaded. Eventually during sustained high temperatures, the support ring 84 will expand, providing an enlarged diameter or second state relative to the first state, as shown in FIG. 3C, which corresponds to the third condition (hot). It should be understood the terms "cold," "warm," and "hot" are intended to be relative terms. Since the first and second surfaces 88, 90 are disengaged with one another; the expanded support ring 84 will not control the radial position of the supported structure 78.

Referring to FIG. 3D, during a rapid cool down, such as a rapid deceleration, the supported structure 78, which has a higher CTE, will more rapidly contract than the support ring 84. During the cool down transition, the circumferential length of supported structure 78 decreases until the circumferential length at gap 92 equals the circumference of the support ring 84. At this point the support structure 78 has cooled enough that the gap 92 has closed, and the gap 78C begins to open, this transient point is known as "Un-lock". In this condition, the support ring 84 is starts to become loaded. As cooling continues the gap 78C get larger, and the radial position of the supported structure 78 is controlled by the support ring 84. Beneficially, the support ring 84, which has a lower CTE, will remain generally in the second state, which prevents the supported structure 78 from moving too far radially inward. Thus, during the cool down the support structure 78 is controlled by a slower cooling and different growth rate support ring 84.

When the support ring 84 is in the second state, and the supported structure 78 is cooling back to the first state, the support structure 78 is held at a larger radial position. Thus, if a re-heating event was to occur at this time, quickly raising the supported structure back to the second state, it will already be partially in a larger radial position.

Figure 4A:
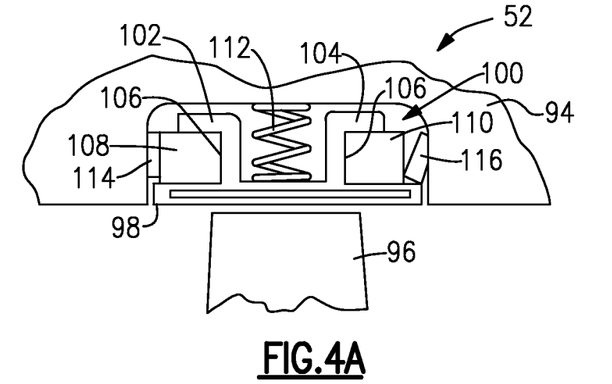
FIG. 4A illustrates the supported structure in a rotatable stage.
Figure 4B:
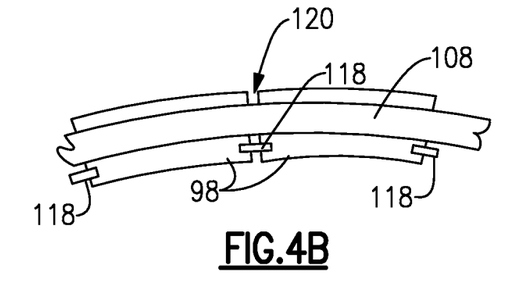
FIG. 4B depicts an array of blade outer air seals.
Figure 4C:
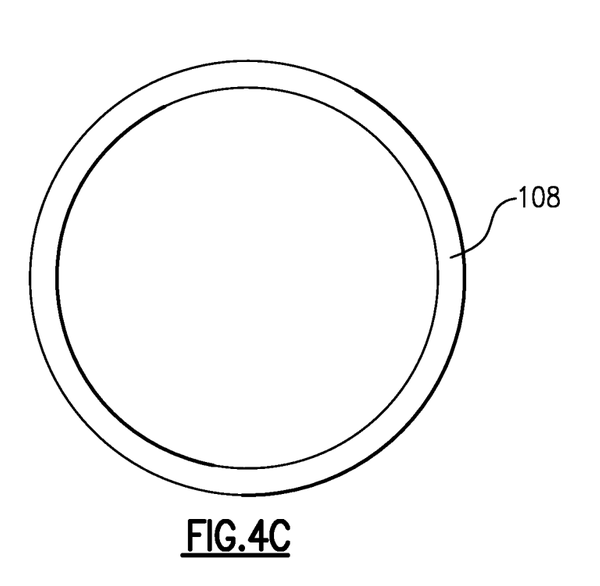
FIG. 4C illustrates a circumferentially continuous, unbroken support ring.

One example implementation of the arrangements shown in FIGS. 3A-3D is illustrated in FIGS. 4A-4B. A high pressure section 52 includes a high pressure compressor case 94. A BOAS 98 is operatively supported relative to the high pressure compressor case 94. A blade 96 is adjacent to the BOAS 98, which is received in an annular pocket 100 of the high pressure compressor case 94. A sufficient operating clearance is desired between the tip of the blade 96 and the BOAS 98 throughout various engine operating conditions. The BOAS 98 is operatively connected to fore and aft hooks 102, 104. The fore and aft hooks 102, 104 each provide a recess 106 that respectively receive fore and aft support rings 108, 110.

A radial biasing member 112 radially biases the BOAS 98 radially inward with respect to the high pressure compressor case 94. A seal 114 seals between the fore support ring 108 and the high pressure compressor case 94. A seal 116, which also acts as an axial biasing member, engages the aft support ring 110 and the high pressure compressor case 94.

As illustrated in FIG. 4B, an array of circumferentially arranged BOAS 98 is positioned relative to one another about the support rings. During cold conditions, a circumferential gap 120 is provided between adjacent BOAS 98. A seal, such as a feather seal 118 is provided between the adjacent BOAS 98 to seal the circumferential gap 120. The circumferential gaps 120 close in the second condition (schematically illustrated in FIG. 3B), and the radial gaps between the support rings and the BOAS 98 behave as described above with respect to FIGS. 3A-3D.

Figure 5A:
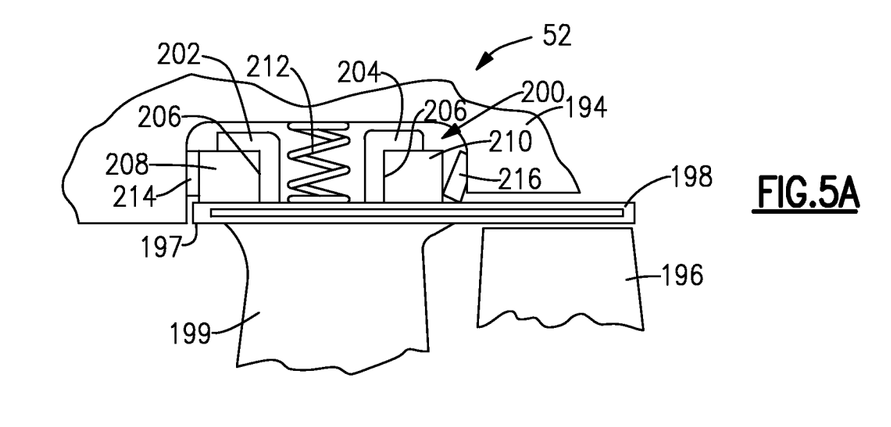
FIG. 5A depicts the supported structure in a fixed stage.
Figure 5B:
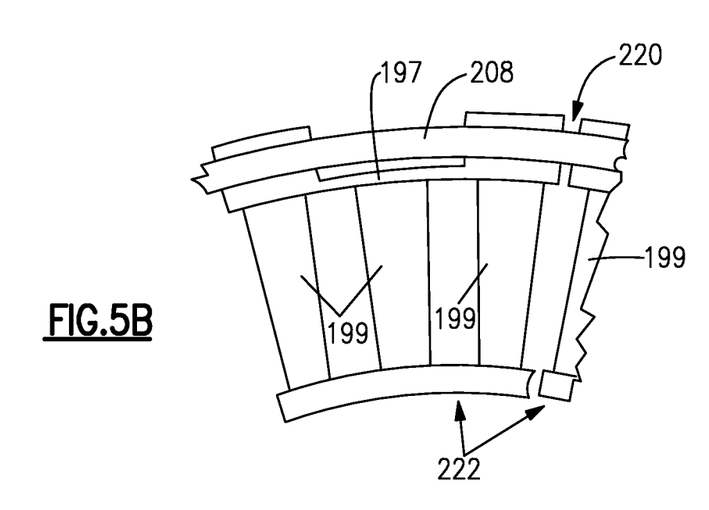
FIG. 5B depicts an array of stator vanes.

Another example implementation of the arrangements shown in FIGS. 3A-3D is illustrates in FIGS. 5A-5B. A high pressure section 52 includes a high pressure compressor case 194. A vane 199 is operatively supported relative to the high pressure compressor case 194. In one example, the vane 199 includes an outer platform 197 disposed in an annular pocket 200 of the high pressure compressor case 194. The outer platform 197 provides a BOAS 198. A sufficient operating clearance is desired between the tip of the blade 196 and the BOAS 198 and between the vane 199 and adjacent sealing structure, such as a rotor. The outer platform 197 is operatively connected to fore and aft hooks 202, 204. The fore and aft hooks 202, 204 each provide a recess 206 that respectively receive fore and aft support rings 208, 210.

A radial biasing member 212 radially biases the BOAS 198 radially inward with respect to the high pressure compressor case 194. A seal 214 seals between the fore support ring 208 and the high pressure compressor case 194. A seal 216, which also acts as an axial biasing member, engages the aft support ring 210 and the high pressure compressor case 194.

As illustrated in FIG. 5B, an array of circumferentially arranged vanes 199 are positioned relative to one another about the support rings. In the example shown, the vanes 199 may be arranged in clusters 222 about the support rings. During core conditions, a circumferential gap 220 is provided between adjacent BOAS 198. The circumferential gaps 220 close in the second condition (schematically illustrated in FIG. 3B), and the radially gaps between the support rings and the outer platform 197 behave as described above with respect to FIGS. 3A-3D.

Although an example embodiment has been disclosed, a worker of ordinary skill in this art would recognize that certain modifications would come within the scope of the claims. For that reason, the following claims should be studied to determine their true scope and content.

What is claimed is:

1. A radial position control assembly for a gas turbine engine stage comprising:
   a case structure;
   a supported structure operatively supported by the case structure, the supported structure including a hook providing an annular recess;
   a support ring received in the recess, the supported structure and the support ring having different coefficients of thermal expansion, wherein the support ring is a continuous annular structure about 360° of a circumference about which the support ring cannot uncouple from itself such that the support ring is configured to expand and contract as a unitary structure, and the support ring is a continuous circumferentially unbroken annular structure; and
   a sealing structure adjacent to the supported structure, the support ring maintaining the supported structure relative to the sealing structure at a clearance during thermal transients based upon a circumferential gap between adjacent supported structure and based upon a radial gap between the support ring and the supported structure.

2. The radial position control assembly according to claim 1, wherein the case structure is a compressor case, the supported structure is a blade outer air seal and the sealing structure is a blade.

3. The radial position control assembly according to claim 1, wherein the case structure is a compressor case, and the supported structure is an outer platform of a vane.

4. The radial position control assembly according to claim 3, wherein the vane is arranged in a vane cluster.

5. The radial position control assembly according to claim 1, wherein the coefficient of thermal expansion of the support ring is less than the coefficient of thermal expansion of the supported structure.

6. The radial position control assembly according to claim 5, wherein the support ring is constructed from one of a ceramic matrix composite and a metal alloy, and the supported structure is constructed from one of a ceramic matric composite, a metal alloy and a monolithic ceramic.

7. The radial position control assembly according to claim 5, wherein the support ring includes first and second states, and the supported structure includes expanded and contracted positions in each of the first and second states of the support ring, wherein the circumferential gap is about zero in the expanded state and the circumferential gap is greater than zero in the contracted state, wherein the support ring is enlarged in the second state with respect to the first state, the hook and support ring respectively include first and second surfaces that are radially adjacent to one another to provide the radial gap, and the radial gap is about zero in first and fourth conditions, the first condition with the support ring in the first state and the supported structure contracted, and the fourth condition with the support ring in the second state and the support structure contracted, the radial gap greater than zero in second and third conditions, the second condition with the support ring in the first state and the supported structure expanded, and the third condition with the support ring in the second state and the support structure expanded.

8. The radial position control assembly according to claim 7, wherein the first condition corresponds to a cold condition, the second condition corresponds to a warm condition, the third condition corresponds to a hot condition, and the fourth condition corresponds to a rapid deceleration condition from the hot condition.

9. The radial position control assembly according to claim 5, wherein the support structure includes fore and aft hooks, and fore and aft support rings are respectively arranged in the fore and aft hooks.

10. The radial position control assembly according to claim 9, comprising a fore and aft seal arranged axially between the case structure and the fore and aft support rings respectively, and at least one of the fore and aft seals providing an axial biasing force to the supported structure.

11. The radial position control assembly according to claim 9, comprising a radial biasing member arranged between the case structure and the supported structure providing a radial biasing force to the supported structure.

12. A gas turbine engine comprising:
a compressor section, the compressor section including low and high compressors;
a combustor fluidly connected downstream from the compressor section;
a turbine section fluidly connected downstream from the combustor;
wherein the compressor section comprises:
a compressor case;
a supported structure operatively supported by the compressor case, the supported structure including a hook providing an annular recess;
a support ring received in the recess, the supported structure and the support ring having different coefficients of thermal expansion, wherein the support ring is a continuous annular structure about 360° of a circumference about which the support ring cannot uncouple from itself such that the support ring is configured to expand and contract as a unitary structure, and the support ring is a continuous circumferentially unbroken annular structure; and
a sealing structure adjacent to the supported structure, the support ring maintaining the supported structure relative to the sealing structure at a clearance during thermal transients based upon a circumferential gap between adjacent supported structure and based upon a radial gap between the support ring and the supported structure.

13. The gas turbine engine according to claim 12, wherein the compressor is the high pressure compressor, and the supported structure is arranged in at least one of a fixed and a rotatable stage of the high pressure compressor.

14. The gas turbine engine according to claim 13, wherein the supported structure is a blade outer air seal and the sealing structure is a blade.

15. The gas turbine engine according to claim 13, wherein the supported structure is an outer platform of a vane.

16. The gas turbine engine according to claim 15, wherein the support structure includes fore and aft hooks, and fore and aft support rings are respectively arranged in the fore and aft hooks.

17. The gas turbine engine according to claim 16, comprising a fore and aft seal arranged axially between the case structure and the fore and aft support rings respectively, and at least one of the fore and aft seals providing an axial biasing force to the supported structure.

18. The gas turbine engine according to claim 16, comprising a radial biasing member arranged between the case structure and the supported structure providing a radial biasing force to the supported structure.

19. The gas turbine engine according to claim 13, wherein the coefficient of thermal expansion of the support ring is less than the coefficient of thermal expansion of the supported structure.

20. The gas turbine engine according to claim 19, wherein the support ring includes first and second states, and the supported structure includes expanded and contracted positions in each of the first and second states of the support ring, wherein the circumferential gap is about zero in the expanded state and the circumferential gap is greater than zero in the contracted state, wherein the support ring is enlarged in the second state with respect to the first state, the hook and support ring respectively include first and second surfaces that are radially adjacent to one another to provide the radial gap, and the radial gap is about zero in first and fourth conditions, the first condition with the support ring in the first state and the supported structure contracted, and the fourth condition with the support ring in the second state and the support structure contracted, the radial gap greater than zero in second and third conditions, the second condition with the support ring in the first state and the supported structure expanded, and the third condition with the support ring in the second state and the support structure expanded.

21. The radial position control assembly according to claim 20, wherein the first condition corresponds to a cold condition, the second condition corresponds to a warm condition, the third condition corresponds to a hot condition, and the fourth condition corresponds to a rapid deceleration condition from the hot condition.

* * * * *